US007153207B2

(12) United States Patent
Kaminkow et al.

(10) Patent No.: US 7,153,207 B2
(45) **Date of Patent: *Dec. 26, 2006**

(54) GAMING DEVICE HAVING A DIE OR DICE DIRECTLY ASSOCIATED WITH THE REELS IN THE PRIMARY GAME

(75) Inventors: Joseph E. Kaminkow, Reno, NV (US); Michael MacVittie, Reno, NV (US)

(73) Assignee: IGT, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/326,866

(22) Filed: Jan. 6, 2006

(65) Prior Publication Data

US 2006/0116197 A1 Jun. 1, 2006

Related U.S. Application Data

(62) Division of application No. 10/355,466, filed on Jan. 31, 2003, now Pat. No. 7,004,836.

(51) Int. Cl.
*A63F 13/00* (2006.01)

(52) U.S. Cl. .......................................................... 463/20

(58) Field of Classification Search .................. 463/16, 463/20, 22; 273/143 R
See application file for complete search history.

(56) References Cited

U.S. PATENT DOCUMENTS

| | | | |
|---|---|---|---|
| 2,545,644 | A | 3/1951 | Benton et al. |
| 4,410,178 | A | 10/1983 | Partridge |
| 5,344,145 | A | 9/1994 | Chadwick et al. |
| 5,362,052 | A | 11/1994 | Kubatsch |
| 5,490,670 | A | 2/1996 | Hobert |
| 5,885,157 | A | 3/1999 | Harada et al. |
| 5,964,463 | A | 10/1999 | Moore, Jr. |
| 6,120,377 | A | 9/2000 | McGinnis, Sr. et al. |
| 6,173,955 | B1 | 1/2001 | Perrie et al. |
| 6,190,255 | B1 | 2/2001 | Thomas et al. |
| 6,203,429 | B1 | 3/2001 | Demar et al. |
| 6,213,876 | B1 | 4/2001 | Moore, Jr. |
| 6,270,411 | B1 | 8/2001 | Gura et al. |
| 6,305,686 | B1 | 10/2001 | Perrie et al. |
| 6,336,860 | B1 | 1/2002 | Webb |
| 6,419,579 | B1 | 7/2002 | Bennett |
| 6,461,241 | B1 | 10/2002 | Webb et al. |

(Continued)

OTHER PUBLICATIONS

1DU Dice Unit Advertisement written by starpoint.uk.com, printed on May 14, 2001.

(Continued)

*Primary Examiner*—Kim Nguyen
(74) *Attorney, Agent, or Firm*—Bell, Boyd & Lloyd LLC

(57) ABSTRACT

A gaming device having a die or dice directly associated with the reels in the primary game. One embodiment includes a mechanical die shaker mounted directly adjacent to the reels of the gaming device. The die shaker includes a suitable container that houses at least one die. In one embodiment, the gaming device activates the mechanical die shaker to shake or actuate the die simultaneously with the spinning of the reels. If the player obtains one or more predetermined symbols or combinations of symbols on one or more paylines of the reels, the player obtains an award associated with the position of the shaken die. In this embodiment, if the player does not obtain one or more predetermined symbols or combinations of symbols on one or more paylines of the reels, the player will not obtain any award based on the shaken die.

29 Claims, 10 Drawing Sheets

U.S. PATENT DOCUMENTS

| | | | |
|---|---|---|---|
| 6,481,713 | B1 | 11/2002 | Perrie et al. |
| 6,604,740 | B1 | 8/2003 | Singer et al. |
| 6,616,142 | B1 | 9/2003 | Adams |

OTHER PUBLICATIONS

1DU Dice Mechanism written by Starpoint Electrics Ltd., published in Jul. 2000.
4DU Dice Unit Advertisement written by starpoint.uk.com, printed on Sep. 3, 2002.
Bally Slot Machines Electro-Mechanicals 1964-1980, Revised 3rd Edition written by Marshall Fey.
Dice Games Article describing Poker Dice, published prior to 2001.
Double Dice Advertisement written by JHV Gaming Products, undated, and English explanation from errel.com, printed on Jan. 24, 2003.
Field Testing New Slots Article, written by Strictly Slots, published in Jul. 2000.
Free! 7-Day Trial on Daval's Reel Dice Advertisement written by Gerber & Glass, published in 1936.
Game Devices Advertisement written by starpoint.uk.com, printed on Sep. 3, 2002.
How to Play—Roll & Win Instructions written by WMS Gaming, wmsgaming.com, printed on Aug. 29, 2001.
I Love Lucy Advertisement written by IGT, published in 2002.
Levy Patent Abstract written by Derwent Publications Ltd., published in 1991.
Mikohn Solutions, World Gaming Congress 2000 Edition.
Money Grab Article written by Strictly Slots, published in Apr. 2001.
Money Grab Advertisement written by WMS Gaming, Inc., wmsgaming.com. printed on Jan. 30, 2003.
Monopoly Brochures and Articles, written by WMS Gaming, Inc. published 1998.
Monopoly Party Train Article written by Strictly Slots, published Feb. 2002.
New Kids Article written by Strictly Slots, published in Dec. 2000.
Roll & Win Advertisement written by WMS Gaming, wmsgaming.com, printed Jun. 8, 2001.
Slot Machines A Pictorial History of the First 100 Years, 5th edition, written by Marshall Fey, published 1983 to 1997.
Slot Machine Buyer's Handbook, A Consumer's Guide to Slot Machines written by David L. Saul and Daniel R. Mead, published 1998.
Slot Machines On Parade written by Robert N. Geddes and illustrated by Daniel R. Mead, published 1980.
Spam Article written by IGT, published in 2002.
Starpoint 1DU Dice Unit Product Summary written by Starpoint Electrics Ltd, published in Dec. 1999.
Starpoint 4DU Game Device Product Summary written by Starpoint Electrics Ltd.
Stars, Bars and Bones Game P&M Coins, Inc. avaliable 1997.
Take Your Pick Article, Strictly Slots, published Mar. 2001.
Yahtzee Bonus Advertisement, written by Mikohn Winning Solutions Worldwide, published 1999.
Yahtzee Video Game Advertisement, written by Mikohn Winning Solutions Worldwide, published 1999.

FIG. 4A

| AMOUNT DISPLAYED ON DIE | AWARD AMOUNT |
|---|---|
| 1 | 1 |
| 2 | 2 |
| 3 | 3 |
| 4 | 4 |
| 5 | 5 |
| 6 | 6 |

FIG. 4B

| SYMBOL DISPLAYED ON DIE | AWARD AMOUNT |
|---|---|
| □ | 1 |
| △ | 2 |
| ○ | 3 |
| ☆ | 4 |
| X | 5 |
| ☺ | 6 |

FIG. 4C

| AMOUNT DISPLAYED ON DIE | AWARD AMOUNT |
|---|---|
| 1 | 0 |
| 2 | 0 |
| 3 | 0 |
| 4 | 1 |
| 5 | 2 |
| 6 | 3 |

FIG. 4D

| SYMBOL/ AMOUNT DISPLAYED ON DIE | AWARD AMOUNT |
|---|---|
| 1 | 1 |
| □ | 1 |
| 2 | 2 |
| △ | 2 |
| 3 | 3 |
| X | 6 |

FIG. 4E

| AMOUNT DISPLAYED ON DIE | MULTIPLIER AMOUNT |
|---|---|
| 1 | 1X |
| 2 | 2X |
| 3 | 1X |
| 4 | 2X |
| 5 | 1X |
| 6 | 3X |

FIG. 4F

| AMOUNT DISPLAYED ON SECOND DIE | AWARD AMOUNT |
|---|---|
| 1 | 0 |
| 2 | 0 |
| 3 | 0 |
| 4 | 0 |
| 5 | 1 |
| 6 | 1 |
| 7 | 1 |
| 8 | 1 |
| 9 | 1 |
| 10 | 5 |

GAMING DEVICE HAVING A DIE OR DICE DIRECTLY ASSOCIATED WITH THE REELS IN THE PRIMARY GAME

PRIORITY CLAIM

This application is a divisional of, claims priority to and the benefit of U.S. patent application Ser. No. 10/355,466, filed Jan. 31, 2003, now issued as U.S. Pat. No. 7,004,836, the entire contents of which are incorporated herein.

This application relates to the following commonly owned patent applications: "GAMING DEVICE HAVING A DIE OR DICE DIRECTLY ASSOCIATED WITH THE REELS IN THE PRIMARY GAME," application Ser. No. 11/327,780, and "GAMING DEVICE HAVING A DIE OR DICE DIRECTLY ASSOCIATED WITH THE REELS IN THE PRIMARY GAME," application Ser. No. 11/327,814,

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

The present invention relates in general to a gaming device, and more particularly to a wagering gaming device having a die or dice directly associated with the reels of the primary game.

Gaming devices such as slot machines, video poker machines, blackjack machines and keno machines are well-known. Such gaming devices generally require that the player enter or make a bet or wager to initiate each game and play a game cycle of the game using a play button, bet button, max bet button, repeat bet button or other suitable input device which accepts the player's decision to make a wager and initiate play of the game. Gaming device manufacturers constantly strive to make gaming devices that provide as much enjoyment and excitement as possible.

Gaming devices exist with secondary or bonus games having a goal or objective of rolling one or more dies to achieve the highest award possible. For example, U.S. Pat. No. 6,213,876 provides a gaming device which enables players to wager on the probability of a "shaken" die or dice generating a certain outcome or combinations of outcomes. Other examples are bonus games that use the traditional dice game of Craps. Craps is a game where a player rolls several dies to obtain specific number combinations or numbers on those dice. The game also includes number combinations that the player generally does not want to get such as seven or eleven. This game begins when a player rolls a pair of dice. The dice are actually rolled by the gaming machine. Some machines have physical dice that roll down a slope or vibrate about until finally stopping on a number. Others utilize a video display that simulates the roll of the dice.

Once the dice stop rolling, a number combination or number is displayed to the player, which is the combination of the numbers from each die. Players can wager on whether the rolled number will be a particular number or whether the rolled number will be higher or lower than some number or numbers. Generally, the player continues to roll the dice until they obtain the number from their first roll again, or until they roll a terminator, which is usually the seven or eleven. A seven or eleven is considered "craps" and the game ends after rolling one of these numbers. The probability of winning and receiving an award varies based on the wager by the player. Thus, the potential to obtain large awards coupled with the risk of obtaining a terminator, creates excitement for players.

In other gaming devices, dice are used to simulate a poker hand. Generally, the game is played by rolling five dies. The dice are rolled either by a physical device attached to the gaming machine, or simulated on a video display. A player starts that game with a particular number of rolls. After the player rolls the dice for the first time, a poker hand is created from the numbers indicated by each of the five dies. For instance, U.S. Pat. No. 6,173,955 B1 describes a poker dice gaming device wherein five die are each shaken in separate containers and the number on each die represents a card for the player's poker hand. In other versions of this game, the dice include the symbols from regular playing cards such as Aces, Kings and Queens.

The player tries to obtain one of several different poker combinations such as a four of a kind, a full house or two pair. Different combinations return higher awards than others so the player wants to obtain the best poker hand or combination possible. Therefore, the gaming device enables a player to keep certain dies or numbers from their first roll and then re-roll the rest. In this manner, the player can strive to obtain the best poker combination possible. The player may continue to hold and/or roll the dice until they are out of rolls or until they are satisfied with a particular combination.

Other gaming devices involving dice such as the YAHTZEE™ game are also well known. Such gaming devices generally involve a die or dice being shaken and an award being obtained based on the number displayed on the die or the sum of the numbers displayed on the dice. Furthermore, other gaming device have incorporated a mounted tumbling die, such as the one produced by Starpoint Electronics, Ltd. A mounted tumbling die includes a die situated in a half-dome which allows for a die to appear as tumbling to a player.

Since players continue to seek more entertainment and enjoyment from different types of gaming devices, it is desirable to provide players with gaming devices having new features that increase player use and enjoyment, such as one or more payout indicators for providing players with additional awards.

SUMMARY

The present invention provides a gaming device having a die or dice directly associated with the reels in the primary slot wagering game. One embodiment of the present invention includes a mechanical die shaker mounted directly adjacent to the reels of the gaming device. The die shaker includes a suitable container that houses at least one die. An actuator is at the base of the container. The die rests on the actuator. An activator, such as a solenoid or other suitable activating member is attached to the die actuator. When activated by the gaming device processor, the activator engages the actuator to propel the die into the upper portion of the container. In one embodiment, sensors attached to the inner walls of the container determine the position of the shaken die. The sensors are coupled with the gaming device processor to possibly award a player an additional payout based on the position of the shaken die. Any suitable alternative die shaker may be employed in the present invention. The die shaker may be mechanical or video. The die shaker is preferably controlled by the processor of the gaming device.

In one preferred embodiment of the present invention, the gaming device activates the mechanical die shaker to shake or actuate the die simultaneously with the spinning of the reels. In this embodiment, the player's award is based on the combination of the symbols generated by the reels and the die. That is, if the player obtains one or more predetermined symbols or combinations of symbols on the reels and the shaken die, then the gaming device provides the player an award associated with the obtained combination of reel symbols and the die symbol.

In another embodiment wherein the gaming device activates the die shaker simultaneously with the spinning of the reels, if the player obtains one or more predetermined symbols or combinations of symbols on one or more of the reels (or alternatively in a scatter position), the gaming device provides the player the award associated with the obtained symbol or combination of symbols. In addition to obtaining an award, if any, based on the reels, the player obtains any award associated with the position of the shaken die. For instance, the player may obtain an award associated with the value or symbol facing the player or an award associated with the value or symbol facing in any other direction. It should be appreciated that in this embodiment, the award, if any, provided to the player is based on both the reels and the die.

In another embodiment of the present invention, the gaming device activates the mechanical die shaker to shake or actuate the die simultaneously with the spinning of the reels. In this embodiment, if the player obtains one or more predetermined symbols or combinations of symbols on one or more paylines of the reels, the player obtains any award associated with the position of the shaken die. It should be appreciated that in this embodiment, if the player does not obtain one or more predetermined symbols or combinations of symbols on one or more paylines of the reels (or alternatively in a scatter position), the player will not obtain any award based on the shaken die.

In one embodiment, the player obtains an additional award equal to the value displayed on the shaken die. In an alternative embodiment, the value displayed on the die represents a modifier, such as a multiplier, which modifies the award, if any, the player obtained from the reels. In another embodiment, a plurality of symbols are displayed on a die. In this embodiment, an award is associated with each symbol and the player obtains the award associated with the displayed symbol.

In another embodiment, the processor of the gaming device activates the die shaker to shake or actuate the die prior to the spinning of the reels. In this embodiment, the player will not obtain any additional award based on the position of the shaken die unless the player obtains one or more predetermined symbols or combinations of symbols on one or more paylines of the reels (or alternatively in a scatter position).

In an alternative embodiment, the player may obtain an award based on the position of the shaken die without obtaining one or more predetermined symbols or combinations of symbols on one or more paylines of the reels (or alternatively in a scatter position). In this embodiment, the processor of the gaming device activates the die shaker to shake or actuate the die during the spinning of the reels. If the player does not obtain one of the predetermined symbols or combinations of symbols on one or more of the paylines of the reels, the player may still obtain an award based on the position of the shaken die. For example, if the reels do not stop spinning on a predetermined combination and the die displays a predetermined value or symbol, then the player will obtain an award associated with the predetermined die value or symbol displayed. Alternatively, it should be appreciated that if the reels do not stop spinning on a predetermined combination and the die displays any value or symbol other than the predetermined value or symbol, then the player may obtain no such award.

One alternative embodiment of the present invention includes a plurality of die shakers mounted adjacent to the reels of the gaming device. In this embodiment, the gaming device causes the die in each die shaker to shake or actuate the dice simultaneously with the spinning of the reels. In this embodiment, if the player obtains one or more predetermined symbols or combinations of symbols on one or more of the reels (or alternatively in a scatter position), the gaming device provides the player the award associated with the obtained symbol or combination of symbols. In addition to obtaining an award, if any, based on the reels, the player obtains any award associated with the position of each shaken dice. It should be appreciated that in this embodiment, the award, if any, provided to the player is based on both the reels and the shaken dice.

In another embodiment including a plurality of die shakers, the gaming device causes the die in each die shaker to shake or actuate the dice simultaneously with the spinning of the reels. If the player obtains a predetermined combination on the reels, then in addition to any award obtained from the reels, the player also obtains a combination of the awards, if any, associated with the values or symbols displayed on the shaken dice. Alternatively, the player's award may be the highest or lowest value displayed on or associated with any single die. In an alternative embodiment, different symbol conditions on the reels can cause the awards, if any, associated with none, one, a plurality, or all of the dice of the die shakers to be provided to the player.

In another embodiment including a plurality of die shakers, the processor of the gaming device activates at least one die shaker to shake or actuate the die simultaneously with the spinning of the reels. If the reels stop shaking on one or more predetermined symbols or combinations of symbols and a predetermined value or symbol is displayed on the shaken die, then the processor of the gaming device will activate an additional die shaker. The player obtains a combination of the values or awards, if any, displayed on the die from both shakers. It should be appreciated that the awards associated with the die of the second die shaker may be of different (such as greater) values (or average values) than the awards associated with the die of the initial die shaker.

In one alternative embodiment, the player must make a predetermined wager to obtain the value or award associated with the die or dice. In one such embodiment, to actuate the die or dice, the player must make the maximum wager or more than the minimum wager in the primary game. For example, the first credit wagered buys the spin of the reels in a slot game and the second credit wagered buys the activation of the die or dice or the results or outcome of the die or dice (i.e., the die or dice could be activated in all spins, but the award or value only provided if there is a second credit wager). Thus, a separate wager could be associated with the die or dice in addition to the wager associated with the reels or primary game.

In one alternative embodiment of the present invention, a die shaker may function with or be associated with a bonus game of the gaming device. In this embodiment, upon the player obtaining one or more predetermined symbols or combinations of symbols on the reels, the gaming device activates the reels a die shaker. In one such embodiment, the amount displayed on the shaken die reveals the players bonus award. In one embodiment, the die or dice functions in conjunction with one or more free spins or one or more nudges of the reels.

In alternative embodiments of the present invention, the die or dice are directly associated with another primary wagering game, such as a card game. For example, the die or dice are directly associated with a video poker game and operate directly in conjunction with or part of such primary wagering game.

It is therefore an advantage of the present invention to provide a gaming device having a die or dice directly associated with or part of the primary game.

Other objects, features and advantages of the invention will be apparent from the following detailed disclosure, taken in conjunction with the accompanying sheets of drawings, wherein like numerals refer to like parts, elements, components, steps and processes.

BRIEF DESCRIPTION OF THE FIGURES

FIGS. 4A, 4B, 4C, 4D, 4E and 4F are tables which illustrate the amounts displayed on the die and possible associated awards or modifiers such as multipliers.

DETAILED DESCRIPTION

Figure 1A:
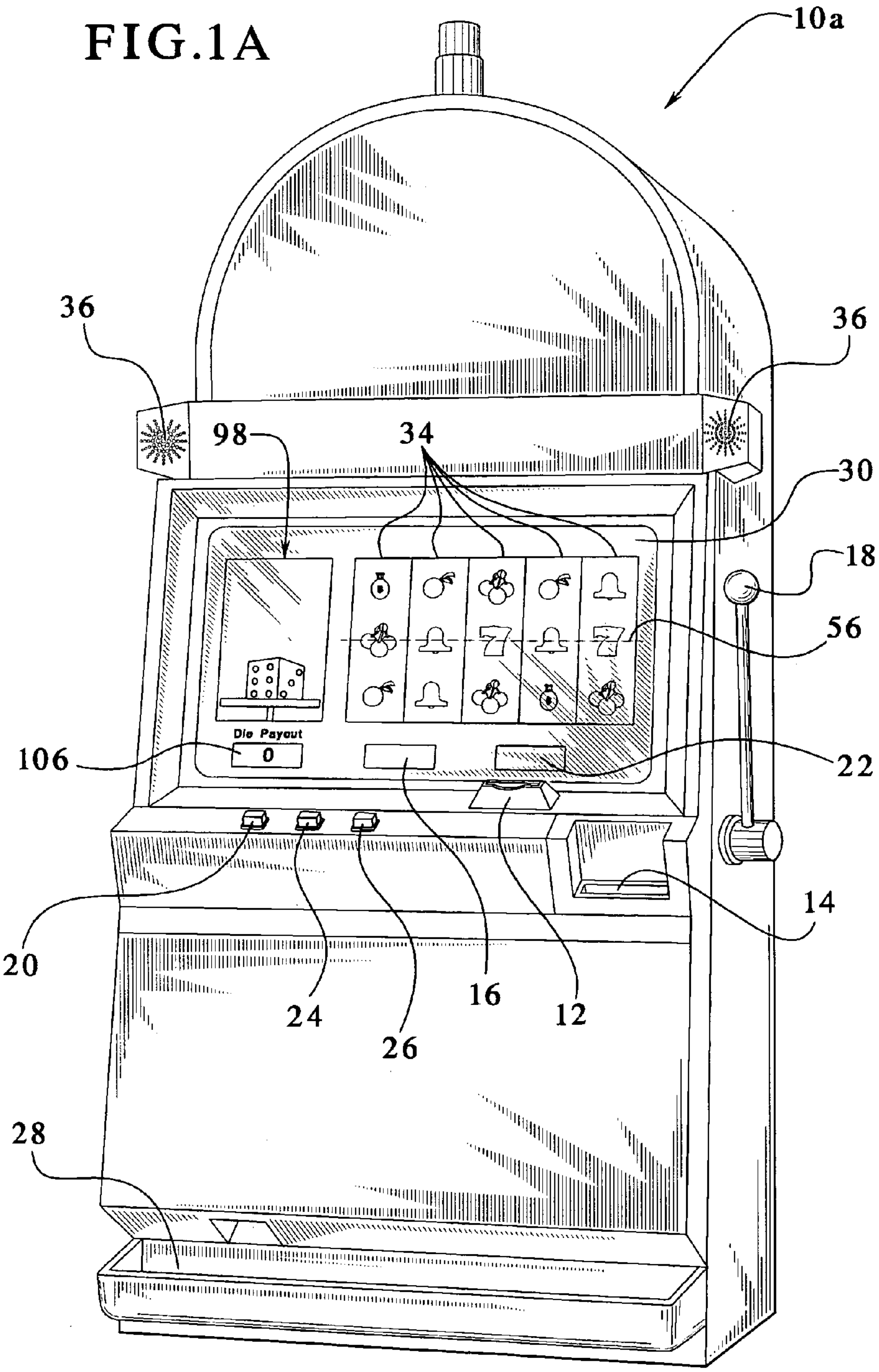
FIGS. 1A, 1B and 1C are perspective views illustrating one embodiment of the gaming device of the present invention.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

Referring now to the drawings, three example alternative embodiments of the gaming device of the present invention are illustrated in FIGS. 1A, 1B, 1C, 1D and 1E as gaming device 10*a*, gaming device 10*b*, gaming device 10*c*, gaming device 10*d* and gaming device 10*e*, respectively. In one embodiment, the gaming device is a slot machine having the controls, displays and features of a conventional slot machine. It is constructed so that a player can operate it while standing or sitting, and gaming device is preferably mounted on a console. However, it should be appreciated that gaming device can be constructed as a pub-style table-top game (not shown) which a player can operate preferably while sitting. Furthermore, gaming device can be constructed with varying cabinet and display designs, as illustrated by the designs shown in FIGS. 1A through 1E.

The gaming device of the present invention could alternatively incorporate any other primary game such as poker, blackjack or keno, any bonus triggering events and any bonus games. The symbols and indicia used on and in the gaming device may be in mechanical, electrical or video form.

As illustrated in FIGS. 1A through 1E, the gaming devices 10*a*, 10*b*, 10*c*, 10*d* and 10*e* include a coin slot 12 and bill acceptor 14 where the player inserts money, coins or tokens. The player can place coins in the coin slot 12 or paper money in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A through 1E, the gaming devices 10*a*, 10*b*, 10*c*, 10*d* and 10*e* include a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. The gaming devices may also include a bet max button which enables the player to easily make the maximum allowed wager.

A player may cash out and thereby receive a number of coins corresponding to the number of remaining credits by pushing a cash out button 26. When the player cashes out, the player receives the coins in a coin payout tray 28. The gaming device may employ other payout mechanisms such as credit slips redeemable by a cashier or electronically recordable cards which keep track of the player's credits.

One embodiment of the present invention includes a mechanical die shaker 98 directly adjacent to the reels. As shown in FIGS. 1A to 1C and 1E, the gaming devices 10*a*, 10*b*, 10*c* and 10*e* includes a die shaker 98 mounted or positioned directly adjacent to the reels 34 in the line of sight of the player. As shown in FIG. 1D, the gaming device 10*d* could also include a plurality of die shakers positioned adjacent to the reels of the gaming device.

Figure 3A:
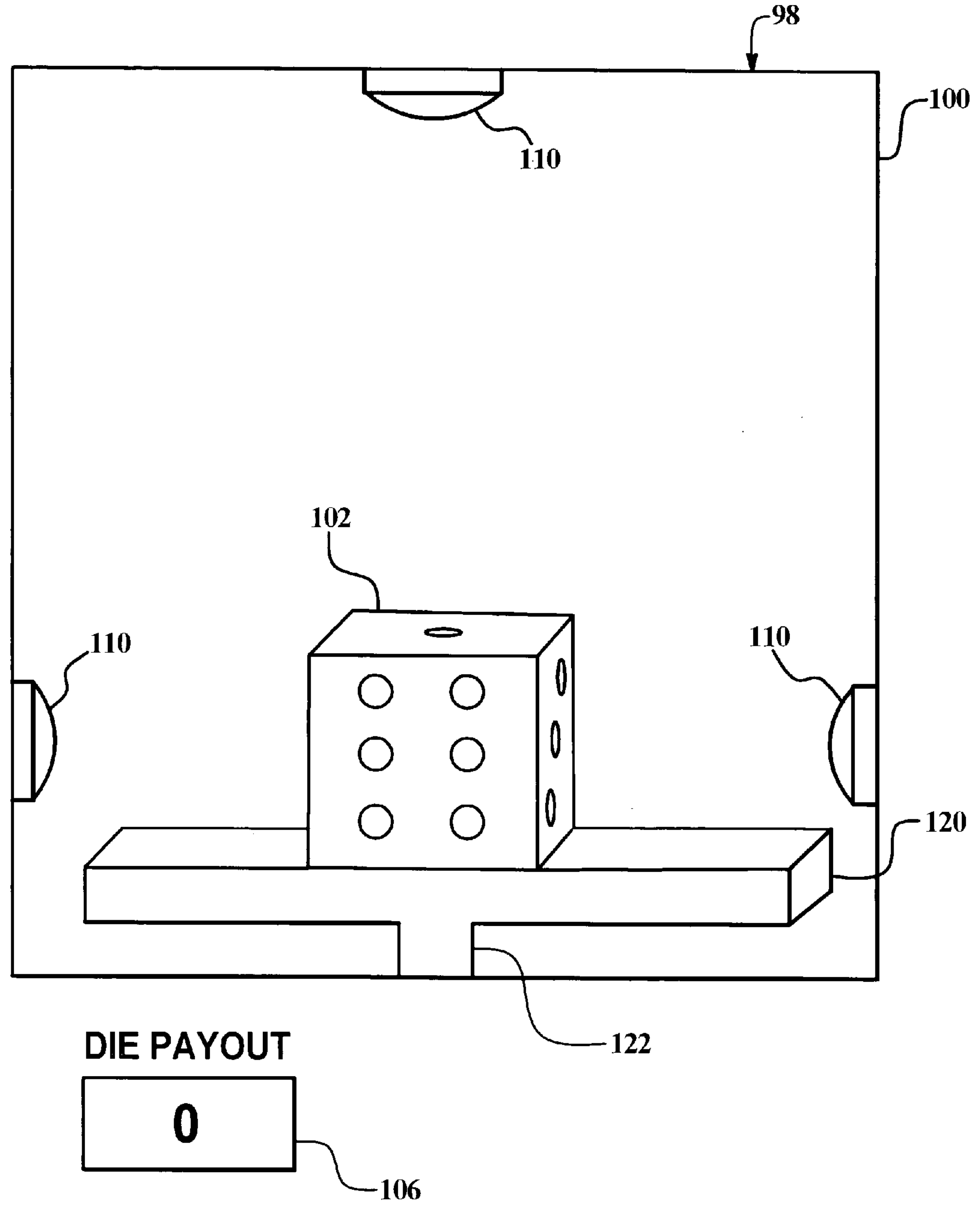
FIGS. 3A and 3B are fragmented views of one embodiment of a mechanical die shaker.
Figure 3B:
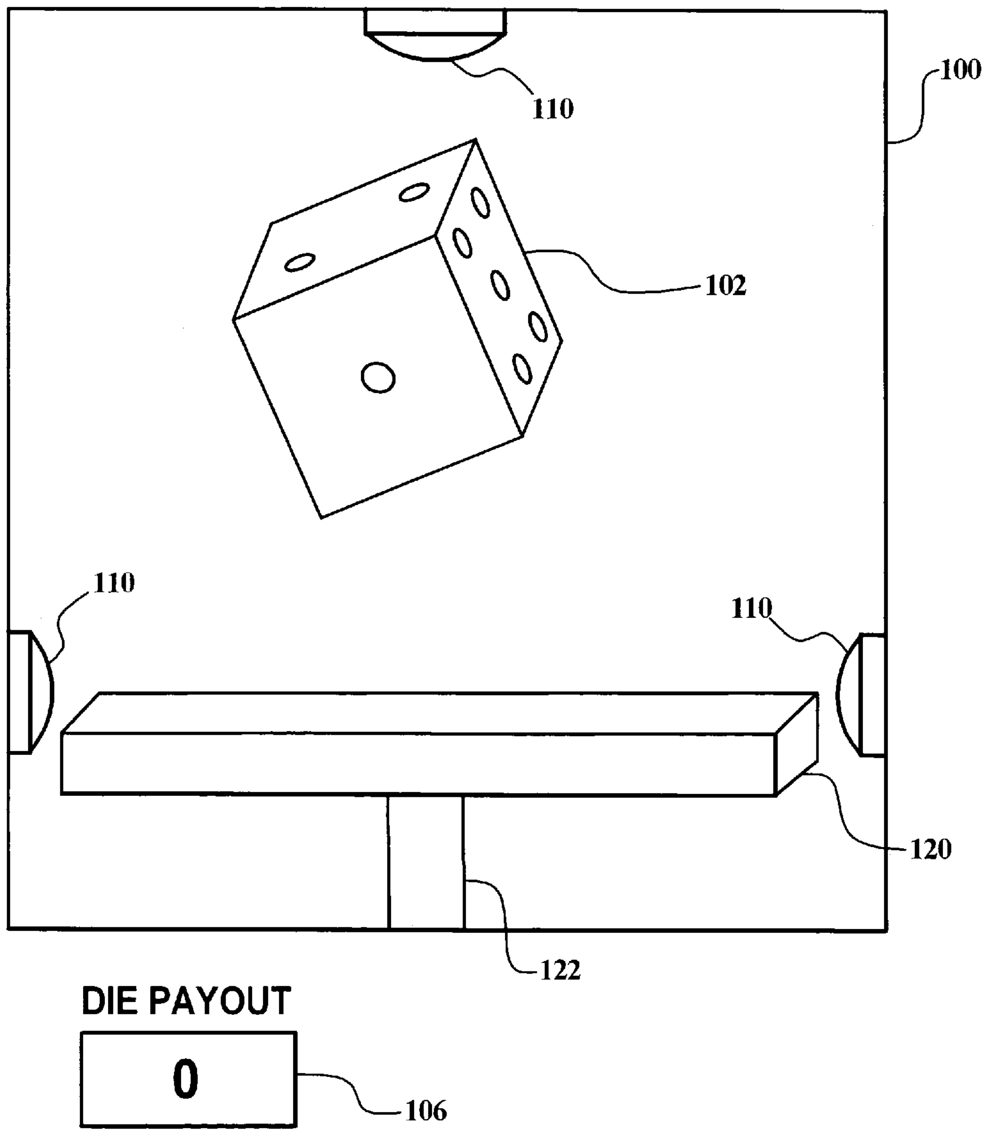

As illustrated in FIGS. 3A and 3B, one embodiment of the mechanical die shaker 98 includes a transparent container 100 that houses at least one die 102. In an alternative embodiment, the die shaker container is partially transparent. As seen in FIG. 3A, the die rests on an actuator 120 positioned at the base of the die shaker 98. Attached to the actuator is an activator 122, such as a solenoid, spring mechanism, stepper motor, magnetic device, electromagnet, air injector, or other suitable activating member capable of propelling or directing the die into the upper portion of the container. As seen in FIG. 3B, when activated, the activator 122 engages the actuator 120 causing the resting die to be propelled into the upper portion of the container. It should be appreciated that other suitable mechanical or video mechanisms may be used to shake the die or dice of the present invention. Preferably, such mechanisms are mounted adjacent to the reels in the line of sight of the player and are controlled by the processor.

In one embodiment, each mechanical die shaker further includes one or more suitable die detection devices (such as optical sensors, magnetic sensors or other suitable mechanisms) to enable the processor of the gaming device to determine the position of the shaken mechanical die. As illustrated in FIGS. 3A and 3B, attached at varying heights to the inner walls of each container are a plurality of optical sensors 110 which are connected to the gaming device processor. In one alternative embodiment, the optical sensors are coupled with optical receptors affixed to the die. The optical sensors are placed at a height slightly above or parallel to the die actuator, to enable the optical sensors to be directly aligned with the resting die. Additional optical sensors 110 are attached at a plurality of locations along the inner walls or ceiling of each container to enable the processor to determine the position of each shaken die. Any suitable commercially available optical sensor may be used.

In another alternative embodiment of the present invention, gaming device 10*e* includes one or more display devices. The embodiment shown in FIG. 1E includes a central display device 30 as well as an upper display device 32. Gaming device 10*e* displays a plurality of reels 34, preferably three to five reels 34 in video form at one or more of the display devices. Gaming device 10*e* also displays a die shaker in video form. It should be appreciated that the display devices can display any visual representation or exhibition, including but not limited to movement of physical objects such as mechanical reels and wheels, mechanical die shakers, dynamic lighting and video images. A display device can be any viewing surface such as glass, a video monitor or screen, a liquid crystal display or any other display mechanism. If the reels 34 are in video form, the display device for the video reels 34 is preferably a video monitor.

Each reel 34 displays a plurality of indicia such as bells, hearts, fruits, numbers, letters, bars or other images which preferably correspond to a theme associated with the gaming device 10. Furthermore, gaming device 10 preferably includes speakers 36 for making sounds or playing music.

Figure 2:
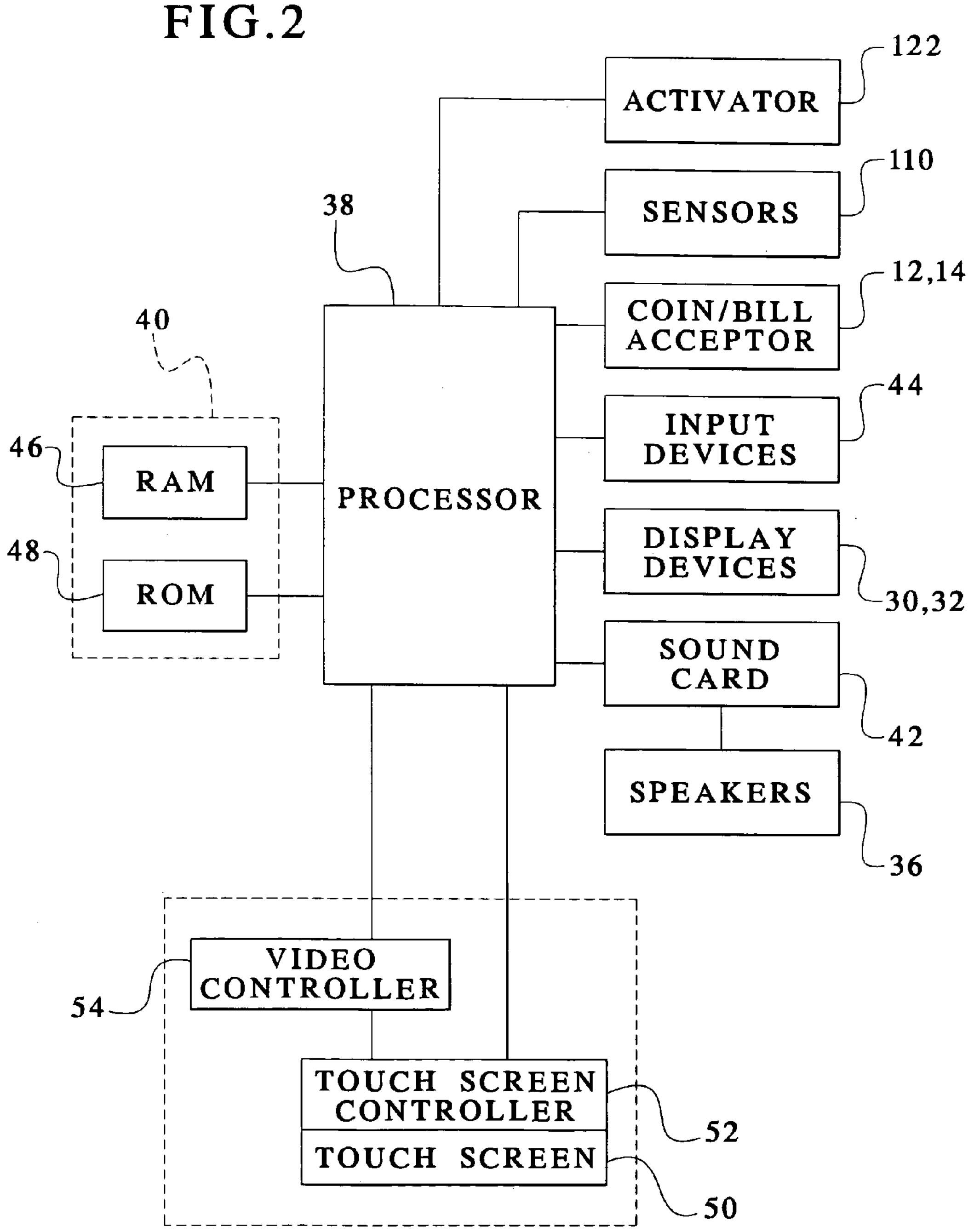
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a sound card 42; a plurality of speakers 36; an activating member 122 for shaking the die; sensors 110 for determining the position of the die; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables. In an alternative embodiment, gaming device 10*b* includes a central display device 30 and an upper display device 32.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively or alternatively referred to herein as a "processor"). Furthermore, although the processor 38 and memory device 40 preferably reside on each gaming device unit, it is possible to provide some or all of their functions at a central location such as a network server for communication to a playing station such as over a local area network (LAN), wide area network (WAN), Internet connection, microwave link, and the like. The processor 38 and memory device 40 is generally referred to herein as the computer or controller.

With reference to FIGS. 1A to 1E and 2, to operate the gaming device in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits. It should be appreciated that the present invention can include one or more paylines displayed in a horizontal and/or diagonal fashion.

In another embodiment of the present invention, in addition to winning credits as described above the gaming device may also give players the opportunity to win credits in a bonus round. This type of gaming device will include a program which will automatically begin a bonus round when the player has achieved a qualifying condition in the game. Preferably, the qualifying condition is a predetermined combination of indicia appearing on a plurality of reels 34.

METHOD OF OPERATION

One embodiment of the present invention provides a single die shaker adapted to provide the player an additional award which is directly associated with and activated simultaneously with the reel spin and is in addition to the payout from the reels.

In one preferred embodiment of the present invention, the gaming device activates the mechanical die shaker to shake or actuate the die simultaneously with the spinning of the reels. In this embodiment, the gaming device provides the player an award, if any, based on the combination of symbols generated on the paylines of the reels (or alternatively in a scatter position) and the die. That is, a plurality of combinations of reel symbols and die symbols are associated with an award. If the shaken die and the spun reels combine to form one of these combinations, the gaming device provides the player the award associated with the obtained reel and die combination.

In another embodiment, the gaming device activates the mechanical die shaker to shake or actuate the die simultaneously with the spinning of the reels. In this embodiment, if the player obtains one or more predetermined symbols or combinations of symbols on one or more of the reels (or alternatively in a scatter position), the gaming device provides the player the award associated with the obtained symbol or combination of symbols. In addition to obtaining an award, if any, based on the reels, the player obtains any award associated with the position of the shaken die. Thus in this embodiment, the award, if any, provided to the player is based on both the reels and the die.

Figure 1B:
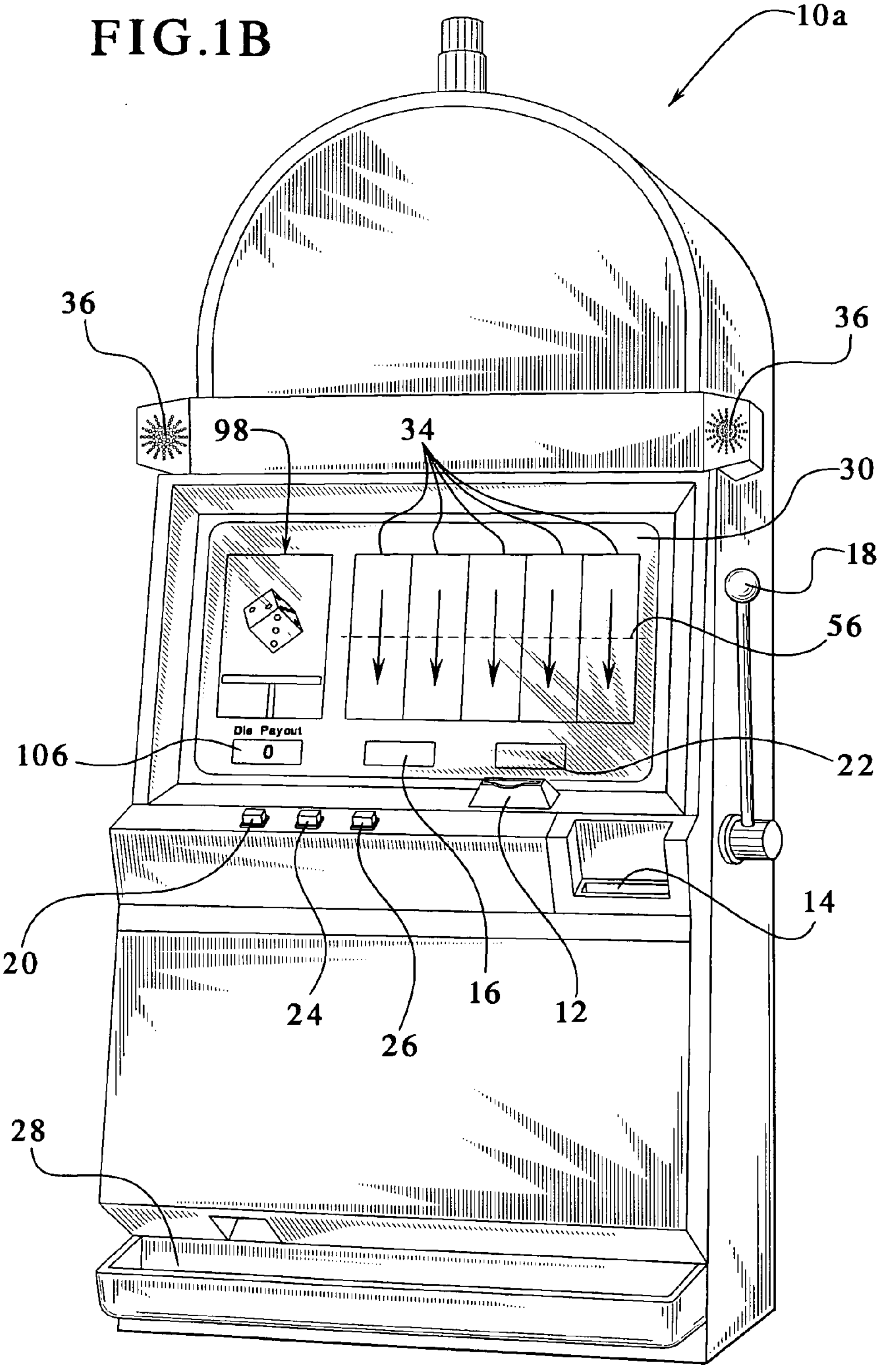
Figure 1C:
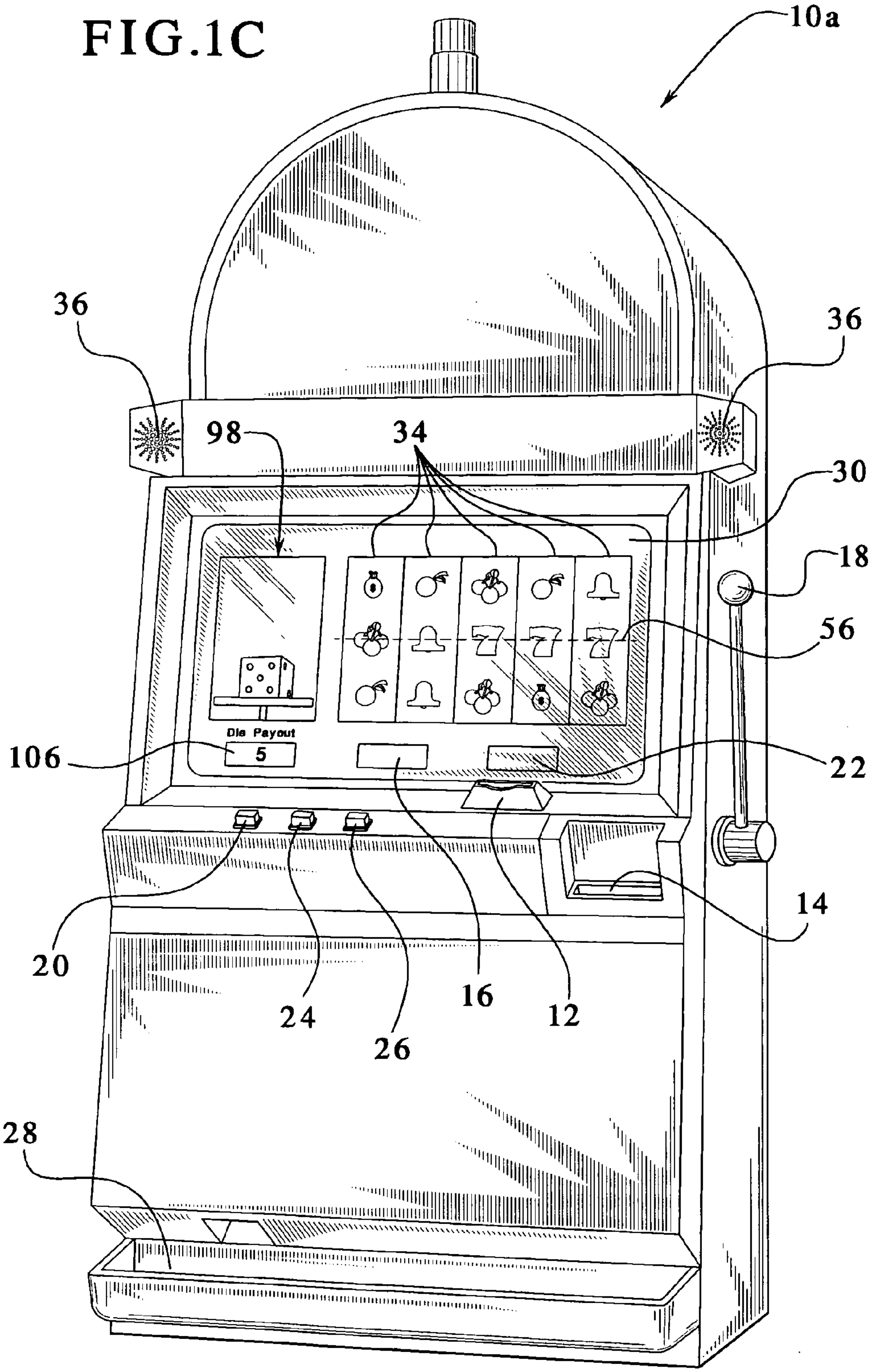
Figure 1D:
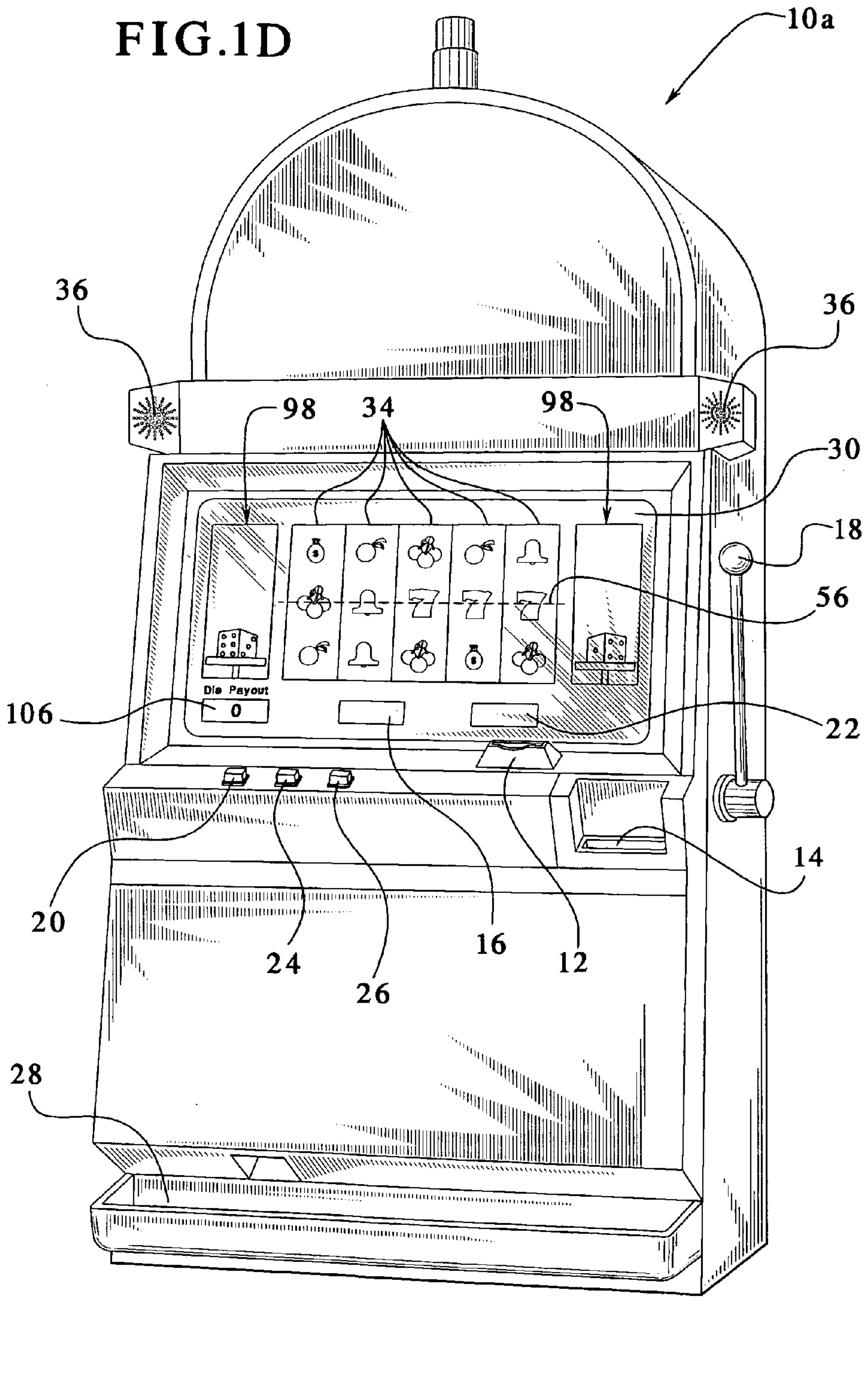
FIGS. 1D and 1E are perspective views of alternative embodiments of the gaming device of the present invention.
Figure 1E:
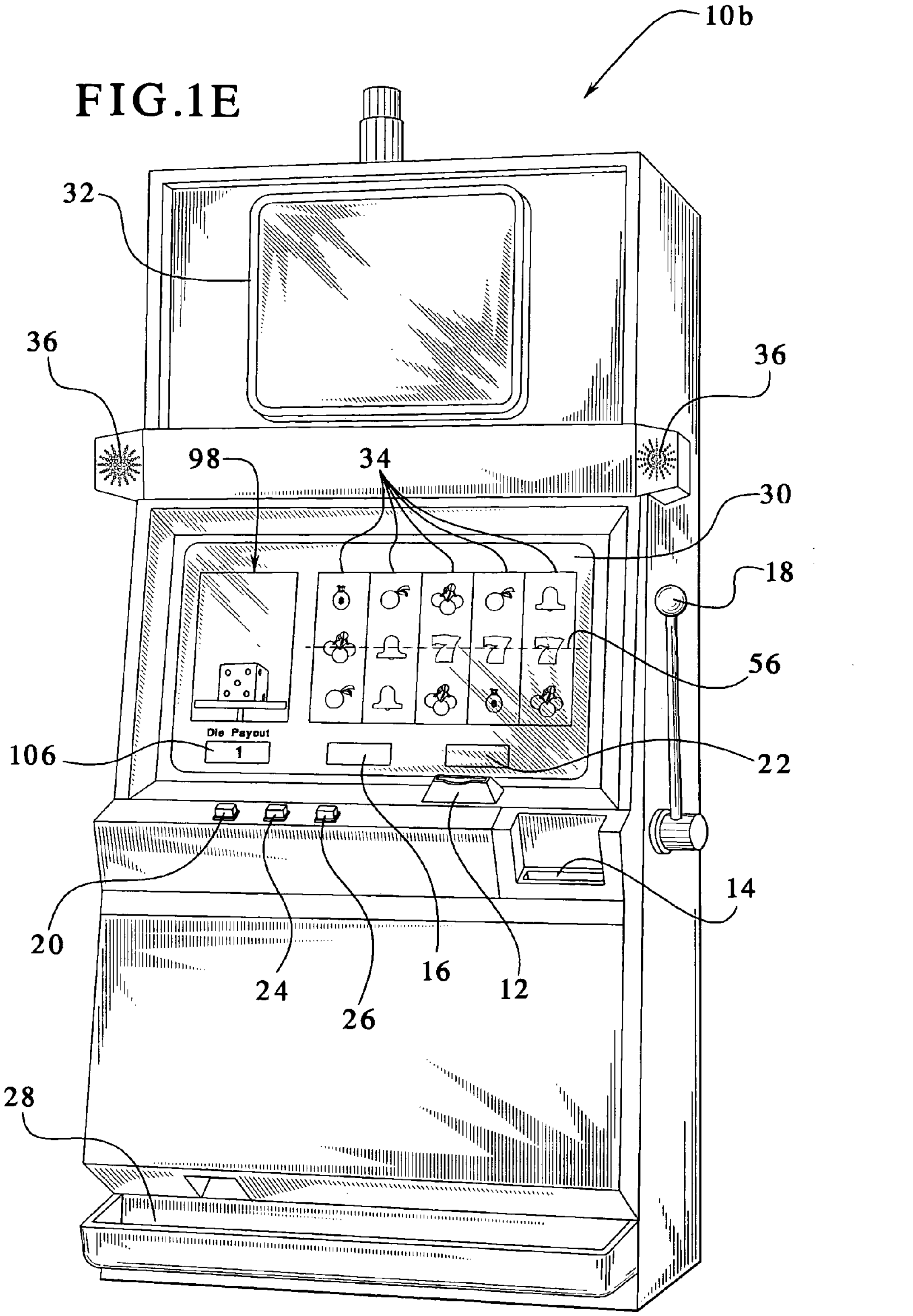

Referring generally to FIGS. 1A to 1C, in one embodiment of the present invention, the gaming device activates the mechanical die shaker to shake or actuate the die simultaneously with the spinning of the reels. If the player obtains one or more predetermined symbols or combinations of symbols on one or more paylines of the reels, the player obtains any award associated with the position of the shaken die. For instance, the player may obtain an award associated with the value or symbol facing the player or an award associated with the value or symbol facing in any other direction. It should be appreciated that in this embodiment, if the player does not obtain one or more predetermined symbols or combinations of symbols on one or more paylines of the reels (or alternatively in a scatter position), the player will not obtain any award based on the shaken die.

As illustrated in FIGS. 1A and 3A, prior to the onset of the player activating the primary game of the gaming device, the die rests on the actuator at the base of the die shaker 98. As illustrated in FIGS. 1B and 3B, upon the initiation of the primary game and simultaneous with the reels spinning, the processor of the gaming device activates the activator 122 of the die shaker 98. The activated activator engages the actuator 120 causing the die 102 to be propelled into the upper portion of the die shaker container 100. As illustrated in FIG. 1C, since on one payline of the reels, the player obtained a predetermined combination of symbols, in this case the symbol "7" appearing on three adjacent reels, then as indicated in FIG. 4A, the player would obtain an award of five credits associated with the position of the shaken die in addition to the award obtained from the three "7"'s on the reels. The additional award is displayed on a die payout award display 106. Appropriate messages such as "YOUR DIE PAYOUT HAS AN AWARD OF FIVE CREDITS" are preferably provided to the player visually, or through suitable audio or audiovisual displays. It should be appreciated that if the player had not obtained one or more predetermined symbols or combinations of symbols on the reels, then the player would not obtain an award from the reels nor an award based on the position of the die.

In an alternative embodiment of the present invention, the player may obtain an award based completely on the position of the shaken die. In this embodiment, simultaneous with the spinning of the reels, the processor of the gaming device activates the die shaker to shake the die. If the player does not obtain one or more predetermined symbols or combinations of symbols on one or more paylines of the reels, then the player may still obtain an award based on the position of the die, if the shaken die lands in a predetermined position. For example, if the player does not obtain a predetermined symbol or reel combination on at least one payline, but the die displays a predetermined value or symbol, the player obtains an award associated with the displayed predetermined value or symbol. It should be appreciated that if the die displays any value or symbol other than the predetermined value or symbol, the player will not obtain any award amount.

In another embodiment, the processor of the gaming device activates the die shaker to shake or actuate the die prior to the spinning of the reels. In this embodiment, the player will not obtain any additional award based on the position of the shaken die unless the player obtains one or more predetermined symbols or combinations of symbols on one or more paylines of the reels. This embodiment increases the player's excitement and enjoyment by enabling the player to view what, if any, additional award they will receive upon a winning reel combination.

In one alternative embodiment, the die or dice includes a trigger symbol or activator symbol. In this embodiment, if the shaken die displays a trigger symbol and the same trigger symbol is randomly generated on the reels, then the matching symbol on the reels functions as a wild symbol. It should be appreciated that the trigger symbol or activator symbol could perform other suitable functions in relation to the reels.

In an alternative embodiment as illustrated in FIG. 1D, the gaming device incorporates a plurality of die shakers. As described above, simultaneous with the reels spinning, the gaming device activates a plurality of die shakers to shake each of their encapsulated die. In this embodiment, if the player obtains a combination of one or more predetermined symbols or combinations of symbols on one or more of the reels (or alternatively in a scatter position) and a plurality of predetermined symbols on the plurality of dice, the gaming device provides the player the award associated with the obtained combination of symbols. That is, a plurality of combinations of reel symbols and die symbols are associated with a plurality of awards. If the player obtains one of these combinations of reel symbols and dice symbols, the gaming device provides the player the associated award.

In an alternative embodiment incorporating a plurality of die shakers, simultaneous with the reels spinning, the gaming device activates a plurality of die shakers to shake each of their encapsulated die. In this embodiment, if the player obtains one or more predetermined symbols or combinations of symbols on one or more of the reels (or alternatively in a scatter position), the gaming device provides the player the award associated with the obtained symbol or combination of symbols. In addition to obtaining an award, if any, based on the reels, the player obtains any award associated with the position of each shaken dice.

In another embodiment wherein the gaming device activates a plurality of die shakers simultaneous with the reels spinning, if the player obtains a predetermined reel combination on at least one payline, then the player obtains an additional award based on a combination of the awards associated with the values or symbols displayed on the shaken dice. An alternative embodiment includes awarding the player the highest or lowest award associated with the value or symbol displayed of any single die. Another alternative embodiment includes the gaming device randomly selecting one of the plurality of activated die shakers and awarding the player an additional award amount associated with the value or symbol displayed on the die of the selected die shaker.

In another alternative embodiment, the gaming device activates each of the plurality of die shakers separately. In this embodiment, while the reels of the gaming device are spinning, the gaming device activates one die shaker. On at least one face of the die encapsulated in the activated die shaker is a symbol indicating the use of an additional die shaker. When the reels stop spinning, if on one or more paylines of the reels a predetermined symbol or combination of symbols is obtained and the shaken die reveals the additional die shaker symbol, then the processor of the gaming device activates an additional die shaker. The amount associated with the value or symbol revealed on the second die represents the player's additional payout award. In an alternative embodiment, the processor of the gaming device may determine if the shaken die reveals the additional die shaker symbol and activate the additional die shaker simultaneous with the spinning of the reels. It should be appreciated that the award amounts associated with the second die may be substantially greater than the award amounts associated with the initial die. For example, the award amounts associated with the first die may range in value from one to five additional credits. However, the award amounts associated with the second die may range in value from ten to fifteen credits.

In an alternative embodiment of a gaming device with a plurality of die shakers, the gaming device activates a die shaker while the plurality of reels are spinning. The processor of the gaming device stops at least one, but not all reels and if that stopped reel(s) display a predetermined symbol on a payline, the processor of the gaming device activates an additional die shaker. If on one or more paylines of the reels, the player obtains one or more predetermined symbols or combinations or symbols, then in addition to any award obtained from the reels, the player also obtains an additional award based on a combination of the awards associated with the values or symbols displayed on both shaken die. In an alternative embodiment, if the player does not obtain a predetermined combination of the reels, then the player is still awarded an award associated with the position of the additional shaken die.

In another embodiment of the present invention the shaking of the die may also be coupled to a bonus scheme. When the reels display at least one of a plurality of predetermined combinations, such as a die symbol appearing on three adjacent reels, then the player is provided with an opportunity for a bonus payout. In one preferred embodiment, a shake die indicator is placed in an operative state when the reels display a predetermined combination. If the player presses the shake die indicator, the processor of the gaming device activates the die shaker, the die is shaken and the amount displayed on the die represents a bonus payout award the player will receive.

In another embodiment of die being incorporated into a bonus scheme, a plurality of die shakers may be attached adjacent to the reels of the gaming device. Each die shaker may be activated by a different predetermined combination of the reels. For example, upon a reel combination of three sevens the processor of the gaming device may activate the die shaker on one adjacent side of the reels, while upon a reel combination of three die the processor of the gaming device may activate the die shaker on the other adjacent side of the reels. In an alternative embodiment, each die shaker contains a different die with different award values associated with each die. For example, a die shaker encapsulating a die with small award amounts may be associated with a frequently obtained combination. On the other hand, a die shaker encapsulating a die with large award amounts may be associated with a rarely obtained combination.

In another embodiment of dice being incorporated in a bonus scheme, while the reels are spinning, the gaming device may activate an initial die shaker. The amount displayed on the die would provide an additional award if on one or more paylines of the reels the player obtains one or more predetermined symbols or combinations of symbols. If the player does not obtain any predetermined symbols or combinations of symbols on the reels, then as part of a bonus scheme, the gaming device may randomly activate a subsequent die shaker to determine if the player will obtain any bonus award amount.

In an alternative embodiment of the present invention (not shown), the gaming device may additionally have a plurality of potential die multipliers which could increase the value indicated on the face of the die by any desired amount, such as 2× or 3×. The plurality of potential die multipliers could be displayed to the player and the die multiplier that will be applied may be illuminated to the player. The die multiplier scheme may be activated randomly or by a predetermined combination of the reels. It should be appreciated that the selected multiplier may be randomly determined or predetermined according to a frequency of occurrence wherein certain multipliers will occur more frequently than other multipliers. In one embodiment, the die or dice may determine a multiplier for one or more free spins of the reels or be used to determine the number of free spins. In one embodiment, a multiplier is provided for every activation of the die. The multiplier could be predetermined (or randomly determined) from a plurality of potential multipliers. In another alternative embodiment, to obtain a multiplier, the gaming device enables the player to make an additional wager. In one alternative embodiment, the reels include a symbol related to the die or dice such as a die symbol. If the die symbol is randomly generated on the reels, the die symbol functions as a wild symbol and the symbols on the die function as multipliers which determine the multiplier used in association with any win on the reels, including any win with the wild symbol. In another embodiment, the processor randomly determines which die shaker sequence outcomes will be modified by a multiplier.

In one embodiment, the die in the die shaker may be a conventional die, with six sides or faces. In another embodiment, the die may be customized with a plurality of sides or faces, such as a three sided die. In another embodiment, the die may have a number associated with each side or face. The number may represent an award, a multiplier or a number of additional reel spins that the player will obtain. In this embodiment, as shown in FIG. 4A, the value displayed on each face of the die is equal to the award amount associated with that face. In an alternative embodiment, as illustrated in FIG. 4B, the die may have a symbol, such as a star, associated with each side or face. Each symbol on the die may be associated with a prize or award amount. For example, the star symbol may have an associated award amount of four credits. The award associated with each symbol may be predetermined or randomly determined. It should be appreciated that the die may have the same number or symbol displayed on more than one side or face. In another embodiment, as illustrated in FIG. 4C, the die may have the same award amount associated with more than one number or symbol displayed on the die. For example, an award amount of zero is associated with the displayed values of one, two and three. In an alternative embodiment, referring to FIG. 4C, the number displayed on the die may represent an award amount of a different value than the displayed number. For example, if the die displayed a number three, the award amount associated with the number three may be an award of zero. In an additional embodiment, as illustrated in FIG. 4D, a die may have a combination of numbers and symbols on its plurality of sides or faces. In this case, each number and symbol will have an associated award amount as described above. It should be appreciated that each face of the die could have the same probability of being obtained. Alternatively, a weighted probability may be provided such that the gaming device randomly determines which face is selected based on the different probabilities associated with each of the different faces of the die or dice.

Referring to FIG. 4E, in an alternative embodiment of the present invention, the amount displayed on the die represents a multiplier of any award that the player may obtain from the reel game. For example, if the reels were to stop in a combination that award the player two credits and the shaken die displayed a value of two, then as indicated in FIG. 4E, the die would represent a multiplier of 2× and the player's reel award of two credits would be multiplied by two resulting in the players final award of four credits. It should be appreciated that in this embodiment, if the player does not win any award from the primary reel game, then the player will not obtain an additional award from the die multiplier.

It should be appreciated that although the mentioned embodiments describe a gaming device having a die shaker having an actual or mechanical die, the present invention may be electronic or video based. In one embodiment, the reels may be mechanical while the die display may be video. Alternatively, the reels may be video while the die shaker may be mechanical. Alternatively, the reels and the die shaker may both be illustrated by one or more video displays. Alternatively, there may be a combination of one or more mechanical die shakers and one or more video displays illustrating die being shaken. It should be appreciated that the die shaker could also have alternative mechanical forms. The term "die shaker" as used herein includes other devices which include or provide a display of a die to a player.

It should also be appreciated that the present invention contemplates other combinations of one or more die shakers with or as part of a primary wagering game where the die shaker acts in conjunction with other elements of the primary game to determine an award for the player.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention claimed is:

1. A gaming device operable under control of a processor, said gaming device comprising:

a housing;

a primary game operable upon a wager by a player;

a plurality of reels of the primary game supported by said housing, wherein each of said reels includes a plurality of symbols;

a die shaker of the primary game supported by said housing, wherein said die shaker is concurrently operable with said reels of the primary game and includes a die having a plurality of positions wherein each position is associated with a symbol and an activating member in communication with said die;

a plurality of awards associated with a plurality of combinations of symbols on the plurality of reels and the die; and a die detection device;

said processor operable with said die shaker and said die detection device, said processor operable to activate said die shaker to shake said die while at least one of said plurality of reels are spinning, to detect the position of said shaken die, to determine the symbol associated with the detected position of said shaken die and to provide the player an award, if any, associated with the determined symbol associated with the detected position of the shaken die and the symbols randomly generated on the plurality of reels in the primary game.

2. The gaming device of claim 1, wherein the processor is operable to provide the player the award, if any, associated with the determined symbol associated with the detected position of the shaken die and the symbols randomly generated on the reels in the primary game, if the plurality of reels generate at least one predetermined reel combination.

3. The gaming device of claim 1, wherein the processor is operable to provide the player the award, if any, associated with the determined symbol associated with the detected position of the shaken die and the symbols randomly generated on the reels in the primary game, if the shaken die lands in a predetermined position.

4. The gaming device of claim 1, wherein the processor is operable to enable the player to activate said die shaker while said reels are spinning.

5. The gaming device of claim 1, wherein said die shaker includes a plurality of die.

6. The gaming device of claim 1, wherein said processor is operable to activate said die shaker to shake said die while said plurality of reels are spinning.

7. A gaming device operable under control of a processor, said gaming device comprising:

a housing;

a primary game operable upon a wager by a player;

a plurality of reels of the primary game supported by said housing, wherein each of said reels includes a plurality of symbols;

a plurality of die shakers of said primary game supported by said housing, wherein said die shakers are concurrently operable with the reels of the primary game and each includes a die with a plurality of positions wherein each position is associated with a symbol and an activating member in communication with said die;

a plurality of awards associated with a plurality of combinations of symbols on the plurality of reels and the dice; and a die detection device;

said processor operable with said die shakers and said die detection device, said processor operable to activate at least one of said plurality of die shakers to shake said die while at least one of said plurality of reels are spinning, to detect the position of said shaken die for each activated die shaker, to determine the symbol associated with the detected position of each shaken die, to provide the player an award, if any, associated with the determined symbols of at least one shaken die and the symbols randomly generated on the plurality of reels in the primary game.

8. The gaming device of claim 7, wherein the processor is operable to activate each die shaker simultaneously with the reels spinning.

9. The gaming device of claim 7, wherein the processor is operable to activate each die shaker sequentially while the reels are spinning.

10. The gaming device of claim 7, wherein the processor is operable to provide the player an award, if any, associated with the determined symbols of each shaken die and the symbols randomly generated on the plurality of reels in the primary game.

11. The gaming device of claim 7, wherein the processor is operate to enable the player to select at least one die shaker.

12. The gaming device of claim 7, wherein at least one of said die shakers includes a plurality of die.

13. The gaming device of claim 7, wherein said processor is operable to provide the player an award, if any, associated with the determined symbols of the shaken die and the symbols randomly generated on the plurality of reels in the primary game, if the symbols randomly generated on the plurality of reels stop in at least one predetermined reel combination.

14. The gaming device of claim 7, wherein said processor is operable to provide the player an award, if any, associated with the determined symbols of the shaken die and the symbols randomly generated on the plurality of reels in the primary game, if at least one of the shaken dice lands in a predetermined position.

15. The gaming device of claim 7, wherein said processor is operable to provide the player an award, if any, associated with the determined symbols of the shaken die and the symbols randomly generated on the plurality of reels in the primary game, if each shaken die lands in a predetermined position.

16. The gaming device of claim 7, wherein said processor is operable to activate at least one of said plurality of die shakers to shake said die while said plurality of reels are spinning.

17. A method of operating a gaming device, said method comprising:

(a) enabling a player to initiate a primary game by making a wager; activating a die shaker to shake a die while at least one of a plurality of reels of the primary game are spinning;

(b) determining a position of said shaken die; and (c) providing the player an award, if any, associated with a combination of a plurality of symbols of said reels and the determined position of said shaken die.

18. The method of claim 17, which includes enabling the player to activate said die shaker.

19. The method of claim 17, wherein said die shaker includes a plurality of die.

20. The method of claim 17, which includes activating the die shaker to shake the die while the plurality of reels of the primary game are spinning.

21. The method of claim 17, which is provided through a data network.

22. The method of claim 21, wherein the data network is an internet.

23. A method of operating a gaming device, said method comprising:

(a) enabling a player to initiate a primary game by making a wager; activating a plurality of die shakers to shake a die within each activated die shaker while at least one of a plurality of reels of the primary game are spinning;

(b) determining a position of each shaken die within each activated die shaker; and (c) providing the player an award, if any, associated with a combination of a plurality of symbols of said reels and the determined position of said shaken dice.

24. The method of claim 23, wherein the plurality of die shakers are activated simultaneously while the reels are spinning.

25. The method of claim 23, wherein the plurality of die shakers are activated sequentially while the reels are spinning.

26. The method of claim 23, wherein the plurality of die shakers are randomly activated while the reels are spinning.

27. The method of claim 23, which includes activating the plurality of die shakers to shake the die while the plurality of reels of the primary game are spinning.

28. The method of claim 23, which is provided through a data network.

29. The method of claim 28, wherein the data network is an internet.

* * * * *